US011174744B2

(12) United States Patent
Binek et al.

(10) Patent No.: US 11,174,744 B2
(45) Date of Patent: Nov. 16, 2021

(54) MULTI-MATERIAL ROTOR FOR ATTRITABLE ENGINES

(71) Applicant: United Technologies Corporation, Farmington, CT (US)

(72) Inventors: Lawrence Binek, Glastonbury, CT (US); Tommy Skiba, East Hartford, CT (US); Matthew B. Kennedy, Vernon, CT (US); Evan Butcher, Manchester, CT (US); Jesse R. Boyer, Middletown, CT (US); Vijay Narayan Jagdale, South Windsor, CT (US); Dmytro Mykolayovych Voytovych, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 188 days.

(21) Appl. No.: 16/148,616

(22) Filed: Oct. 1, 2018

(65) Prior Publication Data

US 2020/0102844 A1    Apr. 2, 2020

(51) Int. Cl.
*F01D 5/34* (2006.01)
*F01D 5/14* (2006.01)

(52) U.S. Cl.
CPC .............. *F01D 5/34* (2013.01); *F01D 5/147* (2013.01); *F05D 2220/323* (2013.01);
(Continued)

(58) Field of Classification Search
CPC ...... F01D 5/34; F01D 5/147; F05D 2220/323; F05D 2300/175; F05D 2220/31;
(Continued)

(56) References Cited

U.S. PATENT DOCUMENTS 7,967,924 B2    6/2011    Groh et al.
9,868,155 B2 *  1/2018    Gerber ................ F04D 29/2227
(Continued)

FOREIGN PATENT DOCUMENTS

EP        3162472 A1    5/2017

OTHER PUBLICATIONS

Application, Drawings and E-Filing Acknowledgement Receipt for U.S. Appl. No. 15/650,107, filed Jul. 14, 2017, 28 pages.
(Continued)

*Primary Examiner* — Eldon T Brockman
*Assistant Examiner* — Andrew Thanh Bui
(74) *Attorney, Agent, or Firm* — Kinney & Lange, P.A.

(57) ABSTRACT

An assembly for use in an attritable engine includes a hub and a blade. The hub is configured to rotate about a centerline axis passing through a center of the hub and is formed with a first type of layer-by-layer additive manufacturing process. The blade is connected to and extends radially outward from the hub. The blade is formed with a second type of layer-by-layer additive manufacturing process that is different than the first layer-by-layer additive manufacturing process. The hub and the blade are integrally formed together as a single piece of material with a layer-by-layer additive manufacturing process. The blade includes a root of a first material, a platform connected to the root, an airfoil connected to and extending from the platform, and a tip connected on a distal end of the airfoil opposite from the root. The platform includes a material that is different from the first.

9 Claims, 4 Drawing Sheets

(52) U.S. Cl.
CPC .. *F05D 2220/3216* (2013.01); *F05D 2230/31* (2013.01); *F05D 2240/24* (2013.01); *F05D 2300/175* (2013.01)

(58) Field of Classification Search
CPC ......... F05D 2240/24; F05D 2220/3216; B22F 10/20; B22F 5/04
USPC .......................................................... 29/889
See application file for complete search history.

(56) References Cited

U.S. PATENT DOCUMENTS

| | | | |
|---|---|---|---|
| 9,914,170 B2* | 3/2018 | Kountanya | B23K 26/342 |
| 10,036,254 B2 | 7/2018 | Smoke et al. | |
| 2013/0195633 A1 | 8/2013 | Hildebrand et al. | |
| 2013/0195671 A1 | 8/2013 | El-Wardany et al. | |
| 2015/0003997 A1 | 1/2015 | Mironets et al. | |
| 2016/0001509 A1* | 1/2016 | Long | B29C 64/393 700/98 |
| 2016/0003058 A1 | 1/2016 | Merry et al. | |
| 2016/0047248 A1 | 2/2016 | Wallis et al. | |
| 2016/0052057 A1* | 2/2016 | Xu | B23K 15/0086 419/5 |
| 2017/0107832 A1 | 4/2017 | Roberts et al. | |
| 2017/0248319 A1* | 8/2017 | McMahan | B22F 7/02 |
| 2018/0247462 A1 | 8/2018 | Lynch | |
| 2018/0274376 A1* | 9/2018 | King | B33Y 80/00 |
| 2018/0328189 A1* | 11/2018 | Frey | C04B 35/653 |
| 2020/0040743 A1* | 2/2020 | Osgood | F01D 5/147 |

OTHER PUBLICATIONS

"SwRI Engineers are Developing a Small Cooled Turbine to Make Drones More Reliable and Efficient", from <https://www.swri.org/press-release/small-cooled-turbine-drones-reliable-efficient?utm_source=EurekAlert&utm_medium=Distribution&utm_campaign=Turbine-Drones-PR>, dated Sep. 4, 2018, 3 pages.

Extended European Search Report for EP Application No. 19200196.4, dated Feb. 17, 2020, 10 pages.

Communication Pursuant to Artilce 94(3) EPC for EP Application No. 19200196.4, dated Apr. 23, 2021, 7 pages.

* cited by examiner

MULTI-MATERIAL ROTOR FOR ATTRITABLE ENGINES

BACKGROUND

The present disclosure generally relates to engines. In particular, the present disclosure relates to manufacturing of engine components for attritable propulsion systems.

Attritable (i.e., expendable) propulsion systems ordinarily have shorter lifespans relative to systems for typical flight applications. Components of such attritable propulsion systems generally require a much lower life cycle fatigue rate as compared to typical propulsion systems. Additionally, attritable propulsion systems generally do not require as high of a level of dimensional accuracy or as low of a level of tolerance allowance as systems for typical flight applications. Regarding the building of engine components for attritable propulsion systems, conventional subtractive manufacturing techniques can be prohibitive in terms of unitizing assembly details, integrating of complex performance-enhancing features, lowering production costs, and reducing time to delivery.

SUMMARY

An assembly for use in an attritable engine includes a hub and a blade. The hub is configured to rotate about a centerline axis passing through a center of the hub and is formed with a first type of layer-by-layer additive manufacturing process. The blade is connected to and extends radially outward from the hub. The blade is formed with a second type of layer-by-layer additive manufacturing process that is different than the first layer-by-layer additive manufacturing process. The hub and the blade are integrally formed together as a single piece of material with a layer-by-layer additive manufacturing process. The blade includes a root of a first material, a platform connected to the root, an airfoil connected to and extending from the platform, and a tip connected to the airfoil on a distal end of the airfoil that is opposite from the root. The platform includes a second material that is different from the first material.

A method of forming a blade includes creating a three-dimensional model of an airfoil. A stress profile of the blade is created with a finite element analysis tool. The stress profile is combined with the three-dimensional model of the blade. Different materials and different layer-by-layer additive manufacturing processes are assigned to different regions of the blade based upon the stress profile. The blade is formed to include a root, a platform, an airfoil, and a tip. The root of the airfoil is formed with a first material and with a first layer-by-layer additive manufacturing process. The platform is connected to the boot. The airfoil is connected to the platform and is formed with a second material and with a second layer-by-layer additive manufacturing process that is different from the first layer-by-layer additive manufacturing process. The tip is connected to the airfoil and is formed with a third layer-by-layer additive manufacturing process that is different from the second layer-by-layer additive manufacturing process.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure discusses the use of additive manufacturing to build a rotor blade directly up from an additively manufactured rotor hub. Different additive manufacturing materials are used in the rotor blade structure as a function of operational stress and performance criteria as determined by a finite element analysis of the rotor blade.

Figure 1:
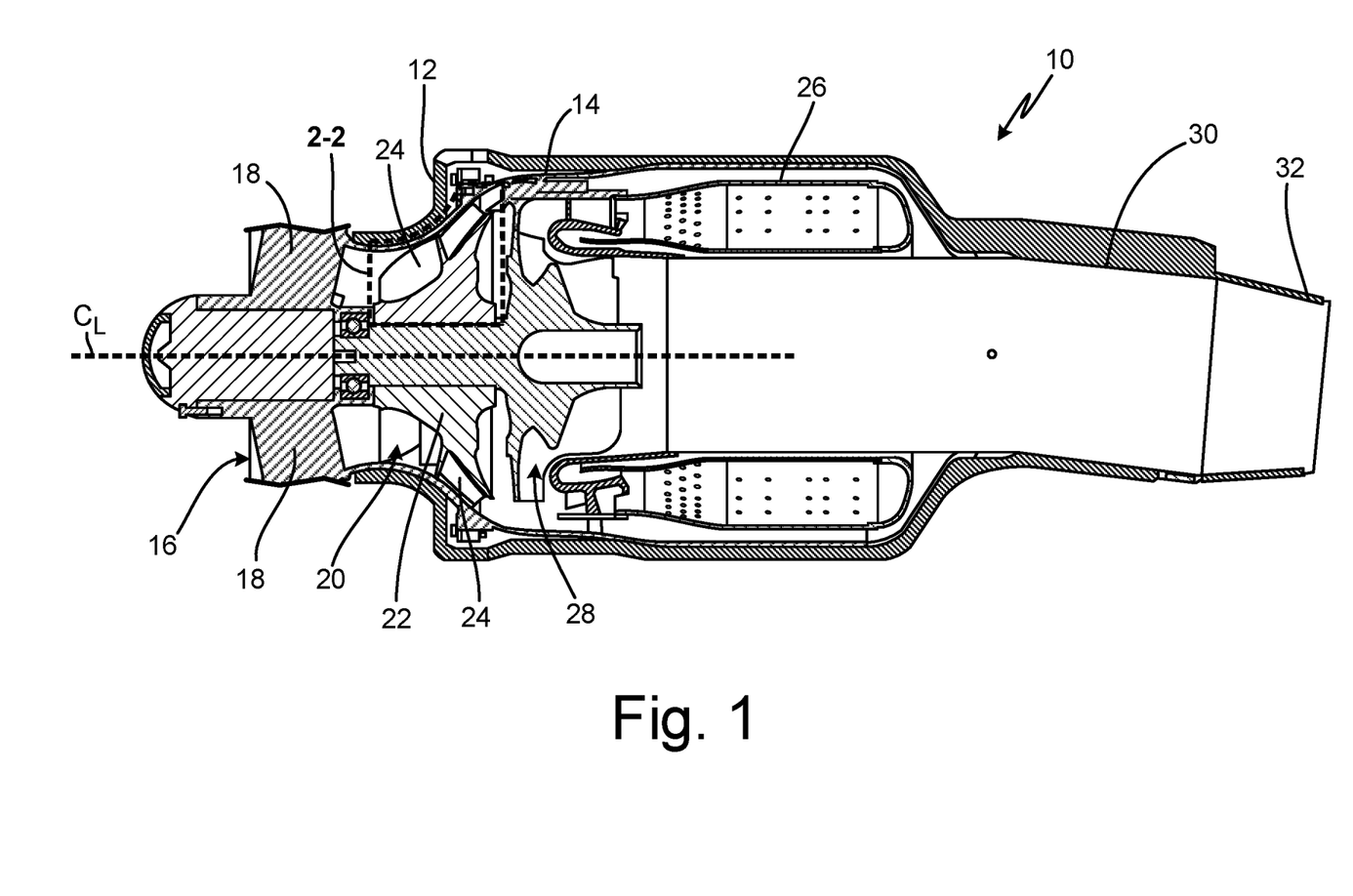
FIG. 1 is a cross sectional view of an attritable engine.

FIG. 1 is a cross sectional view of engine 10 and shows centerline axis $C_L$, outer case 12, inner case 14, inlet 16, guide vanes 18, compressor 20, compressor rotor hub 22, compressor rotor blades 24, combustion chamber 26, turbine 28, exhaust 30, and nozzle 32. As shown in FIG. 1, an upstream direction of engine 10 is to the left and a downstream direction is to the right. This left-to-right downstream orientation applies to FIGS. 1 and 2. An opposite orientation applies to FIGS. 3, 4A, and 4B (e.g., a downstream direction is to the left).

Engine 10 is an engine for an attritable, or expendable, propulsion system for an aircraft. As an engine for an attritable propulsion system, engine 10 can have a shorter lifespan requirement and requires a lower life cycle fatigue rate relative to systems for typical flight applications. As an example, engine 10 can be used with a drone, munitions, or other unmanned aerial vehicles. Centerline axis $C_L$ is an axis passing through a center of rotating components of engine 10 such as compressor rotor hub 22 and turbine 28.

Outer case 12 and inner case 14 are walls or ducts of solid material. Inlet 16 is a fluidic duct or opening. Guide vanes 18 are vanes or blades for directing a flow of air. Compressor 20 is a portion of engine 10 with compressor rotor hub 22, compressor rotor blades 24, and a duct with a decreasing cross-sectional area in a downstream direction of engine 10 (from left to right as shown in FIG. 1).

Compressor rotor hub 22 is a generally frusto-conically shaped piece of solid material configured to rotate about centerline axis $C_L$. In one example, a material of compressor rotor hub 22 can include an austenitic nickel-chromium-based superalloy such as Inconel, and in particular Inconel 718. In another example, a material of compressor rotor hub 22 can include a titanium alloy such as Ti 6—including a chemical composition of approximately 6% aluminum, 4% vanadium, 0.25% iron, 0.2% oxygen, and the remainder titanium. Compressor rotor blades 24 are airfoil blades. In one example, a material of compressor rotor blades 24 can include an austenitic nickel-chromium-based superalloy such as Inconel, and in particular Inconel 625. In other example, a material of compressor rotor blades 24 can include an age hardened austenitic nickel-based superalloy or a nickel-chromium-iron-molybdenum alloy.

Combustion chamber 26 is a generally annular compartment with an inner cavity. Turbine 28 is a generally conical piece of solid material with airfoil blades that is configured to rotate about centerline axis $C_L$. Exhaust 30 is a tube or duct for transporting a fluid. Nozzle 32 is a downstream end portion of exhaust 30 with a decreased diameter for directing airflow out of exhaust 30.

Engine 10 can be mounted and connected to an aircraft (not shown in FIG. 1). Outer case 12 is disposed around and forms an exterior of engine 10. Outer case 12 is in contact with and connects to various portions of inner case 14. Inner case 14 is connected to various portions of outer case 12 and houses inlet 16, guide vanes 18, compressor 20, compressor rotor hub 22, compressor rotor blades 24, combustion chamber 26, and turbine 28. Inlet 16 is connected to and is formed by an upstream end of inner case 14. Guide vanes 18 are attached to inner case 14 at outer ends of guide vanes 18.

Compressor 20 is disposed within inner case 14 and is positioned downstream of inlet 16 and upstream of both combustion chamber 26 and turbine 28. Compressor 20 is in fluid communication with inlet 16 and with combustion chamber 26. Compressor rotor hub 22 is mounted within inner case 14 and is configured to rotate relative to inner case 14. Compressor rotor blades 24 are connected to and helically extend radially outward from a radially outer surface of compressor rotor hub 22. The formation and connection of compressor rotor hub 22 and compressor rotor blades 24 will be discussed further with respect to FIGS. 2-4B. Combustion chamber 26 is located inside of inner case 14 and is fluidly connected to compressor 20 and to turbine 28.

Turbine 28 is rotatably mounted within inner case 14 and is positioned downstream from compressor rotor hub 22. Turbine 28 is in fluid communication with combustion chamber 26 and with exhaust 30. Exhaust 30 is contained within portions of outer case 12 and inner case 14 and is in fluid communication with turbine 28. Nozzle 32 is disposed at a downstream end of exhaust 30.

Outer case 12 contains and provides structural support for the components of engine 10. Portions of outer case 12 are also used as connecting elements that mount to a portion or portions of an aircraft (not shown in FIG. 1). Inner case 14 contains and guides airflow through portions of engine 10. Air enters engine 10 via inlet 16 and travels to compressor 20. Guide vanes 18 direct the flow of air entering into engine 10, for example by either straightening or imparting swirl into the airflow. Compressor 20 constricts as well as increases the velocity and pressure of the airflow passing through combustor 20. Compressor 20 then delivers the pressurized air to combustion chamber 26.

Compressor rotor blades 24 rotates with compressor rotor hub 22 to increase the velocity of the air through compressor 20 of engine 10. As airfoils, compressor rotor blades 24 impart a swirl, along with an increase in speed, to the air in combustor 20. The air with increased velocity from combustor 20 then enters into combustion chamber 26. Combustion chamber 26 receives the air from combustor 20. In combustion chamber 20, the air is mixed with fuel to create a combustion gas that is ignited in order to drastically increase the pressure of the air output from combustor chamber 26. Turbine 28 receives the ignited combustion gas from combustion chamber 26 which causes turbine 28 to rotate. Turbine 28 includes feature that propel the ignited combustion gas into exhaust chamber 30. Exhaust 30 transports the ignited combustion gas to nozzle 32. Nozzle 32 provides a restricted portion of exhaust 30 so as to expel gas from exhaust 30 at a velocity and to determine a direction of the outflow of air from exhaust 30.

The lower life cycle requirements for engine 10 allows for the traditional manufacturing constraints to be loosened providing more freedoms with design and material choices. With existing propulsion systems, the components are manufactured with very low tolerance and high precision forms of manufacturing, such as through subtractive manufacturing. Here, because the tolerance and material life cycle requirements are significantly lower, alternative forms of manufacturing are capable of producing the components of engine 10 to meet the system requirements of engine 10, which can include low-cost, one way trip, and/or low life span. For example, additive manufacturing can be used to produce some of the components of engine 10 where low life cycle components are included. In addition, different types of additive manufacturing, as well as weaker or stronger materials, can be used throughout engine 10 to form parts with adequate performance characteristics (e.g., such as strength) based on a stress profile of a given component (e.g., compressor rotor hub 22 and/or compressor rotor blade 24).

Figure 2:
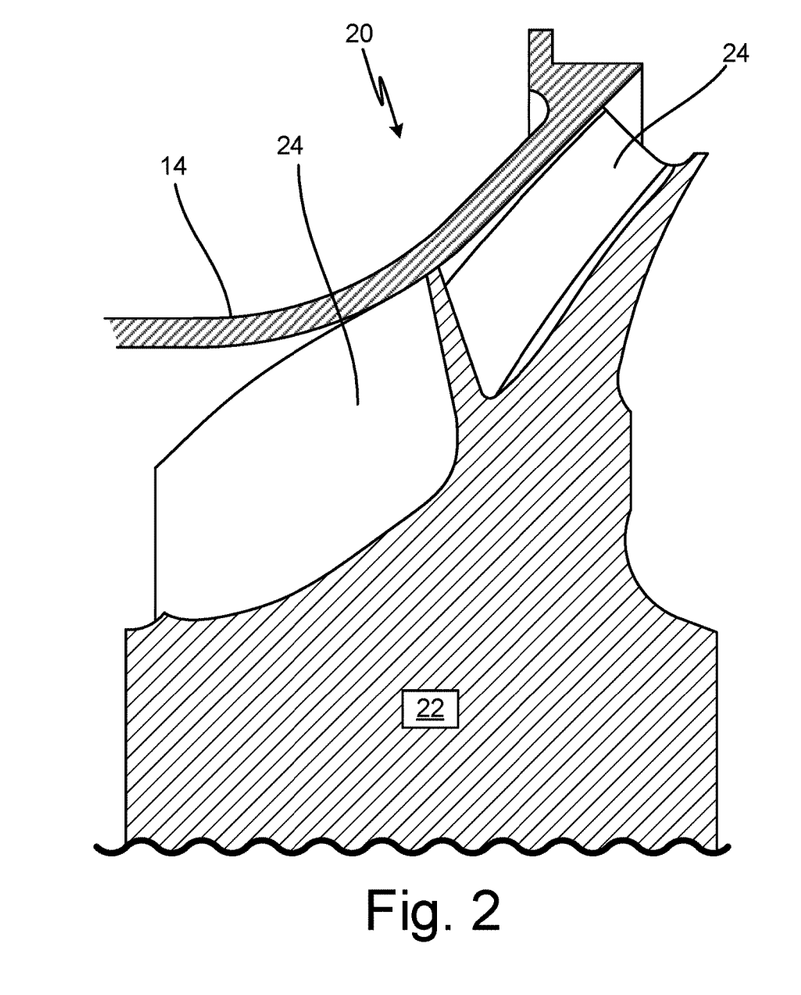
FIG. 2 is an enlarged cross sectional view of a portion 2-2 of FIG. 1 illustrating a hub, blades, and a case of the engine.

FIG. 2 is an enlarged cross sectional view of the portion identified as 2-2 in FIG. 1 of engine 10 and shows inner case 14, compressor 20, compressor rotor hub 22, and compressor rotor blades 24. FIG. 2 shows compressor rotor blade 24 as being integrally formed with compressor rotor hub 22. As discussed with respect to FIG. 1, compressor rotor hub 22 and compressor rotor blade 24 rotates relative to inner case 14.

In this example, compressor rotor hub 22 is formed with a first type of layer-by-layer additive manufacturing process. For example, compressor rotor hub 22 can be formed by laser powder bed fusion or an electron-beam melting ("e-beam") additive manufacturing process. Compressor rotor blades 24 are connected to and helically extends radially outward from compressor rotor hub 22. Compressor rotor blades 24 are formed with a second type of layer-by-layer additive manufacturing process that is different than the first layer-by-layer additive manufacturing process. For example, compressor rotor blades 24 can be formed by directed energy deposition ("DED"), cold spray ("CS"), and/or hot isostatic pressing ("HIP") additive manufacturing process (es), as well as a hybrid additive manufacturing process (e.g., combination of additive and subtractive manufacturing processes). Compressor rotor hub 22 and compressor rotor blades 24 are integrally formed together as a single piece of material with a layer-by-layer additive manufacturing process.

The first and second additive manufacturing process used to build or create compressor rotor hub 22 and compressor rotor blades 24 can be determined based upon stress profiled for each. For example, a stress profile of compressor rotor hub 22 can be used to determine that the first type of layer-by-layer additive manufacturing process should be used to construct compressor rotor hub 22. Likewise, a stress profile of compressor rotor blades 24 can be used to determine which the second type of layer-by-layer additive manufacturing process should be used to construct compressor rotor blade 24 (and as between various regions of compressor rotor blade 24).

The configuration of compressor rotor hub 22 and compressor rotor blade 24 is herein described in comparison to the traditional formation of affixing a series of blades to the hub via thermal or mechanical means. The present configuration of engine 10, with fully integrally formed compressor rotor hub 22 and compressor rotor blade 24, allows for component reduction in engine 10 thereby reducing potential failure modes due to loose interfaces between components. The reduction in component count also reduces a stacking of tolerances between components allowing for a higher degree of manufacturing tolerance control in order to maintain the aerodynamically critical characteristics of compressor rotor hub 22 and compressor rotor blade 24. Particular portions of compressor rotor blade 24 and particular manufacturing processes thereof will be discussed with respect to FIGS. 3, 4A, and 4B.

Figure 3:
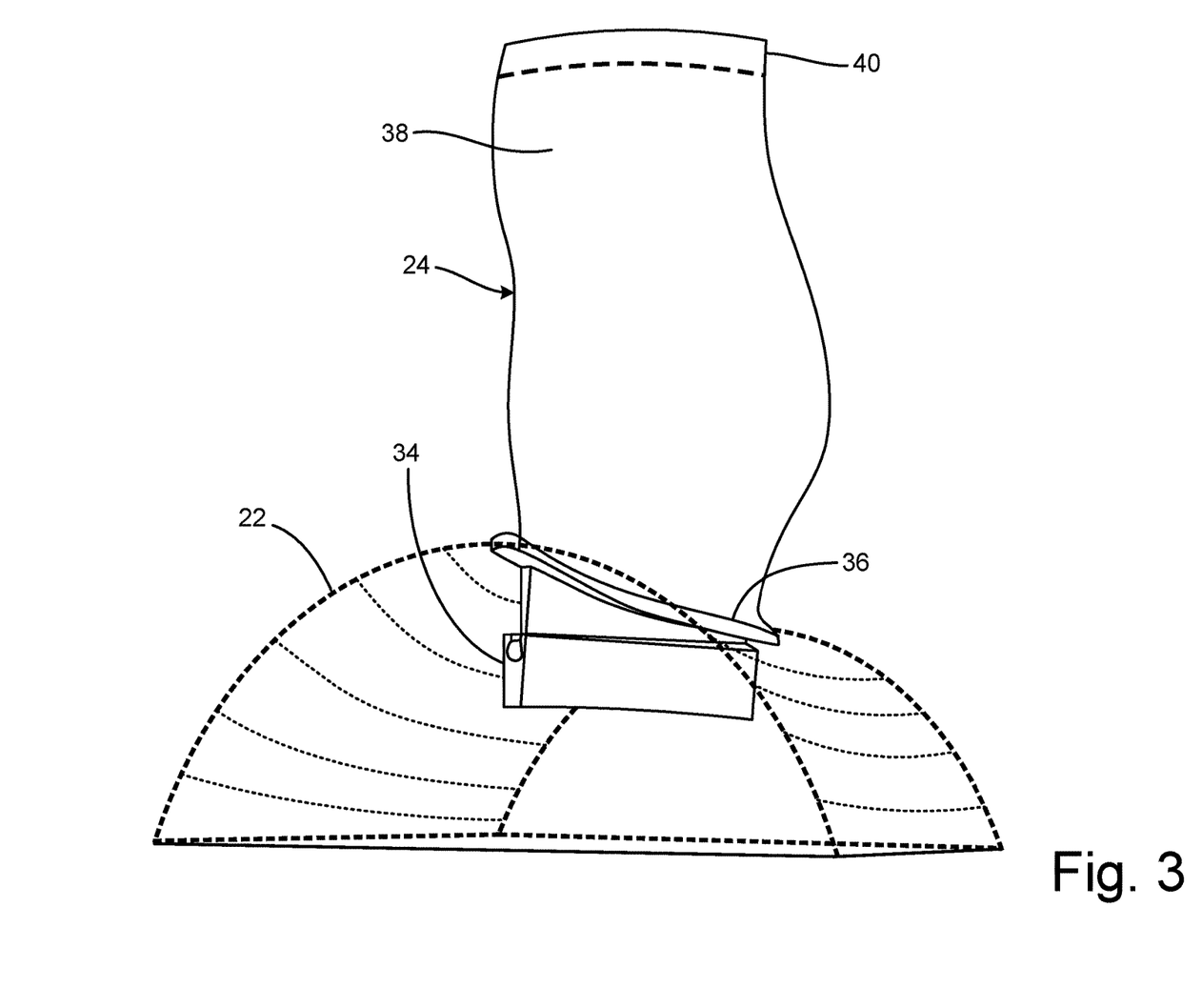
FIG. 3 is a perspective view of the blade shown connected to the hub, with the hub being shown in phantom to provide clarity of the blade.

FIG. 3 is a perspective view of compressor rotor blade 24 shown connected to compressor rotor hub 22, with compressor rotor hub 22 being shown in phantom to provide clarity of compressor rotor blade 24. Compressor rotor blade 24 is shown to include root 34, platform 36, airfoil 38, and tip 40. For clarity, compressor rotor hub 22 is shown to include a single compressor rotor blade 24. In other non-limiting examples, more than one compressor rotor blade 24 can be included with compressor rotor hub 22.

Root 34 is a radially inward end or base of compressor rotor blade 24. In one example, a material of root 34 includes a wrought titanium material. In another example, root 34 is formed with a first layer-by-layer additive manufacturing process such as an e-beam or a laser powder bed fusion additive manufacturing process. Platform 36 is a generally flat, laterally extending surface or ribbon of solid material. Airfoil 38 is a structure with curved surfaces configured to produce an aerodynamic force. In one example, a material of platform 36 and airfoil 38 can include an austenitic nickel-chromium-based superalloy such as Inconel (e.g., Inconel 625), an age hardened austenitic nickel-based superalloy, or a nickel-chromium-iron-molybdenum alloy. In another example, platform 36 and airfoil 38 are formed with a second layer-by-layer additive manufacturing process such as a CS, DED, or a hybrid additive manufacturing process. Tip 40 is a radially outward end of compressor rotor blade 24. A material of tip 40 includes a high hardness material, such as a material with a high Rockwell hardness rating (e.g., HRA, HRB, or HRC). In one example, tip 40 is formed with a third layer-by-layer additive manufacturing process such as a CS additive manufacturing process. In another example, tip 40 can include an abrasion surface.

Root 34 is disposed in and integrally formed with compressor rotor hub 22. Root 34 extends radially inward (relative to rotatable compressor rotor hub 22 and to centerline axis CO from platform 36 and into compressor rotor hub 22. In one example, root 34 is formed with a wrought titanium material with platform 36 and airfoil 38 built up from root 34 using a DED or a hybrid additive manufacturing process. Platform 36 is formed with and connected to root 34 and to airfoil 38. Airfoil 38 is integrally formed with and extends between platform 36 and tip 40. Tip 40 is integrally formed with and extends radially outward from airfoil 38. As between each of root 34, platform 36, airfoil 38, and tip 40, the physical interfaces between each component will largely be unnoticeable outside of subtle witness lines, with slight discolorations between the dissimilar material configurations.

Root 34 is integrally formed with compressor rotor hub 22 so as to permanently attach compressor rotor blade 24 to compressor rotor hub 22. Platform 36 of compressor rotor blade 24 provides structural support for compressor rotor blade 24 as well as comes into contact with platforms of adjoining compressor rotor blades (not shown in FIG. 3). As compressor rotor hub 22 rotates about centerline axis $C_L$ (shown in FIG. 1), airfoil 38 creates a suction force to draw air through compressor 20 and into combustor chamber 26. Tip 40 is connected to and extends radially outward from airfoil 38. During operation of engine 10, tip 40 can be used to abrade a rub strip disposed a radially inward surface of inner case 14 in order to effectively form a sealed interface (with only a small clearance between tip 40 and the radially inward surface of inner case 14). Here, different materials as well as different types of additive manufacturing processes are used in particular areas or zones of compressor rotor hub 22 and compressor rotor blade 24 that relate to the stress levels experienced in a particular zone. Additionally, material selection is based on temperatures experienced by a certain portion or zone of compressor rotor hub 22 or blade 24 to provide a material with a particularly appropriate coefficient of thermal expansion to meet a certain performance requirement.

In one example, an inspection step is used during the building of compressor rotor hub 22 and compressor rotor blade 24. Adaptive machining can be used to start with a laser powder bed fusion additive manufacturing process to form compressor rotor hub 22. Compressor rotor hub 22 is based off of a first 3D model. Once compressor rotor hub 22 is built, compressor rotor hub 22 is inspected and/or scanned to determine the exact profile of compressor rotor hub 22 as-built. This scan can identify imperfections and deformities that may have arisen if compressor rotor hub 22 was not formed precisely to the exact dimensions of the 3D model of compressor rotor hub 22. As such, a 3D scan of compressor rotor hub 22 is performed such as a blue-light scan or other form of 3D optical scanning measurement technology. From the 3D scan of the as-built compressor rotor hub 22, a tool path generation for the construction of compressor rotor blade 24 is determined. For example, the 3D scan of the as-built compressor rotor hub 22 is necessary because as compressor rotor hub 22 is removed from the build plate of the laser powder bed fusion build plate, the features (e.g., datums) used to locate the build process of compressor rotor hub 22 are also removed.

Once compressor rotor hub 22 is removed from the laser powder bed fusion build plate, compressor rotor hub 22 includes an undefined series of surfaces that possibly have slight or minimal distortions resulting in deviations from the 3D CAD model. In order to make sure that subsequent additive manufacturing build processes mate correctly with the as-built compressor rotor hub 22, the 3D optical scanning measurement (e.g., blue-light scan) is required to create an accurate 3D model of the as-built compressor rotor hub 22. This 3D model of the as-built compressor rotor hub 22 is then used as a baseline to drive the tool path generation for the next additive manufacturing process steps. Without these scanning steps, the tool paths for subsequent additive manufacturing process steps would not line up correctly with the features of the as-built compressor rotor hub 22.

Compressor rotor hub 22 and compressor rotor blades 24 being of dissimilar materials enables compressor rotor blades 24 to be designed specifically for a particular application. Compressor rotor blade 24 with tip 40 can be made of a resilient metal which will erode a rub-strip (mounted on the radially inner surface of inner case 14) without degrading performance of compressor rotor blade 24. Localized DED and CS depositions also provide superior engineering part performance of compressor rotor hub 22 and compressor rotor blades 24 if applied at strategic locations such as high temperature and/or high stress zones of compressor rotor blades 24. For example, and as will be discussed with respect to FIGS. 4A and 4B, designing and building compressor rotor hub 22 and compressor rotor blade 24 includes incorporating a material grading as a function of engineering stress and performance requirements throughout the various zones of each of the components.

Figure 4A:
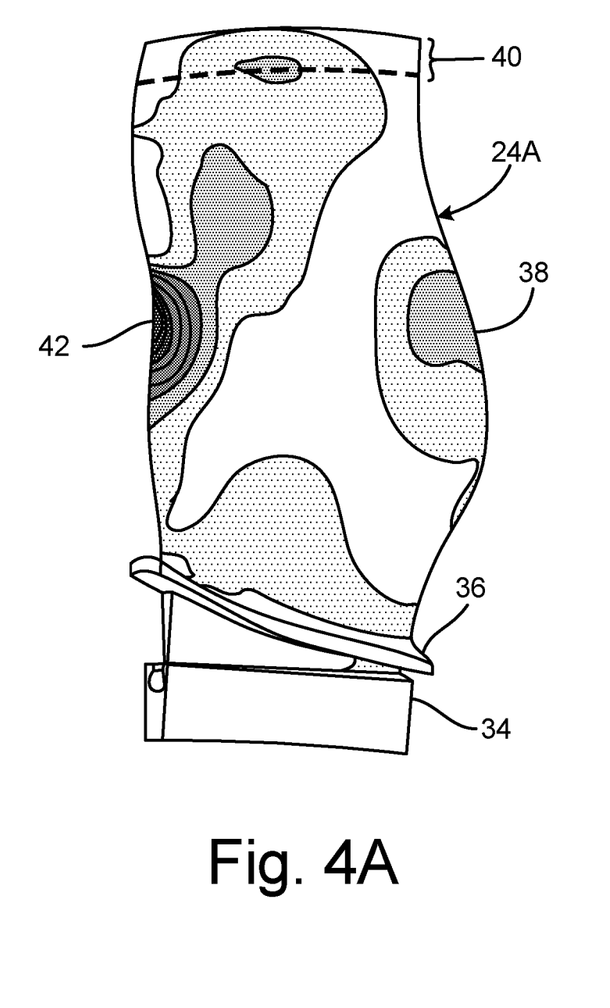
FIG. 4A is a side view of a stress profile of an airfoil blade of the attritable engine.

FIG. 4A is a side view of stress profile 24A of compressor rotor blade 24 and shows root 34, platform 36, airfoil 38, tip 40, and hotspot 42. Stress profile 24A shown in FIG. 4A includes different regions or zones of compressor rotor blade 24 identified by an amount of stress experienced by the particular zone of compressor rotor blade 24. Hotspot 42 is a portion of stress profile 24A that is representative of a portion of compressor rotor blade 24 that experiences a high degree of stress relative to the other portions of compressor rotor blade 24 during use of engine 10.

Stress profile 24A of compressor rotor blade 24 is created with a finite element analysis tool. Appropriate maximum operating conditions are applied to a computer aided design ("CAD") three dimensional ("3D") model representative of compressor rotor blade 24 along with accurate boundary conditions. The CAD 3D model and the initial boundary conditions are then processed through a finite element solver which creates stress profile 24A based on an output of the finite element solver. The measurements from the profile (e.g., in particular from the color plot of stress profile 24A) show the stresses across compressor rotor blade 24. In stress profile 24A, stress is represented as a unit of pressure or force/area and is a function of the finite element solver, with stress profile 24A being a function of the finite element analysis inputs.

Through this finite element analysis, the locations and amounts of stresses (e.g., low and high) are located. Once the locations of high stresses are determine, superior alloy(s) can be assigned and applied to those regions to mitigate the stresses experienced there. In one example, a definition of the particular stress zones of stress profile 24A would be numerically extracted from the output file of the finite element model, which can yield irregular shapes for the different zones of compressor rotor blade 24. In one example of compressor rotor hub 22 and compressor rotor blade 24, a configuration with more than two materials is used and the material application is not a function of the part definition but rather driven by computation means such as the discussed finite element analysis.

With this process, a first region of airfoil 38 (e.g., hotspot 42) subject to at least one of high stress or high temperature is identified with stress profile 24A. A size, a shape, and/or a location of the first region of airfoil 38 is determined from stress profile 24A. A second region of airfoil 38 (e.g., root 34, platform 36, airfoil 38, and/or tip 40) subject to at least one of low stress or low temperature is also identified with stress profile 24A. A size, a shape, and/or a location of the second region of airfoil 38 is determined from stress profile 24A. A first material with which to form the first region of airfoil 38 is determined based on stress profile 24A. A second material with which to form the second region of airfoil 38 is determined based on stress profile 24A. The first and second regions of airfoil 38 are then formed with layer-by-layer additive manufacturing. In this example, an additive manufacturing process is used to form compressor rotor hub 22 before forming compressor rotor blade 24.

Figure 4B:
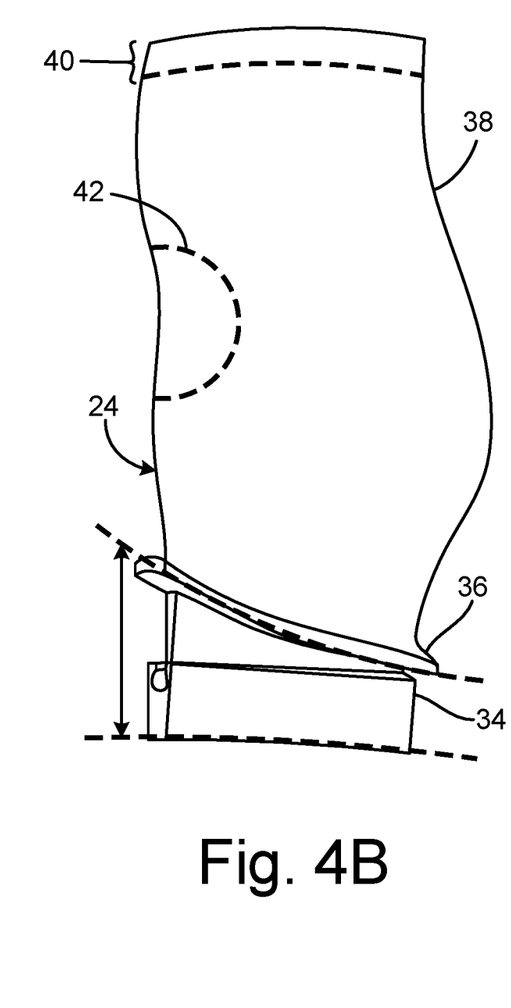
FIG. 4B is a side view of the airfoil showing material composition of different regions of the airfoil.

FIG. 4B is a side view of compressor rotor blade 24 and shows root 34, platform 36, airfoil 38, tip 40, and hotspot 42. In a typical example, a superior alloy is used for root 34 where a large stress concentration will be experienced from a shift in geometry of compressor rotor blade 24 during operation of engine 10. For both platform 36 and airfoil 38, a material used here includes a lesser strength alloy than used for root 34 (and/or for tip 40) Likewise, a different additive manufacturing process or processes are used for platform 36 and airfoil 38 to provide different physical and performance characteristics than root 34 or tip 40. Similarly, a different material and layer-by-layer additive manufacturing process are used for hotspot 42 to provide increased stress and temperature capabilities of hotspot 42. Additionally, a composition of airfoil 38 can vary in a blended fashion in a vicinity of hotspot 42. In one example, tip 40 may rub and wear away more than the other portions of rotor blade 24. In such an instance, rotor blade 24 can be re-used up to the portion of tip 40 that was abraded off. Tip 40 can be cut and the missing portion of tip 40 can be re-built onto the end of rotor blade 24.

By incorporating stress profile 24A into a 3D model of compressor rotor blade 24, compressor rotor blade 24 can be built by grading out (e.g., with DED or CS additive manufacturing processes) a material blend that is a function of radial distance away from the axis of rotation (e.g., centerline axis $C_L$). Here, grading out includes varying a distribution of the material and/or structural characteristics (e.g., hardness, coefficient of thermal expansion, material, etc.) to match certain performance specifications of specific portions of compressor rotor blade 24.

In some examples, after compressor rotor blade 24 is constructed using additive manufacturing processes in accordance with the material grading based on the finite element analysis, subtractive manufacturing processes can be applied to the additive manufactured piece in order to reach the final, critical profile of compressor rotor blade 24.

In other examples, a cooling circuit or circuits can be formed into either compressor rotor hub 22 and/or compressor rotor blade 24 during formation of compressor rotor hub 22 and compressor rotor blade 24. In such examples, cooling channels are built up using laser powder bed fusion or e-beam. Once the basic form or structure of the cooling channels are built, then a coating can be applied to the cooling channels using a CS or similar additive manufacturing technique.

Additionally, the processes of designing and forming compressor rotor blade 24 can also be applied to other types of rotational or stationary airfoil structures such as stators or guide vanes. In other examples, topological optimization can also be used to create the 3D CAD model(s) of compressor rotor hub 22 and or compressor rotor blade 24 in order to remove unnecessary material and weight from the finally built parts. For example, similar to finite elements analysis, boundary conditions such as minimize weight/mass, maximize stiffness, and/or a positive factor of safety can be input into the topological optimization analysis tool. The information or modeling output(s) of the topological optimization analysis tool can then provide a modified shape with weight/mass removed some certain portions yet still allowing compressor rotor hub 22 and blade 24 to maintain requisite operational capabilities.

Discussion of Possible Embodiments

The following are non-exclusive descriptions of possible embodiments of the present invention.

An assembly for use in an attritable engine includes a hub and a blade. The hub is configured to rotate about a centerline axis passing through a center of the hub and is formed with a first type of layer-by-layer additive manufacturing process. The blade is connected to and extends radially outward from the hub. The blade is formed with a second type of layer-by-layer additive manufacturing process that is different than the first layer-by-layer additive manufacturing process. The hub and the blade are integrally formed together as a single piece of material with a layer-by-layer additive manufacturing process. The blade includes a root of a first material, a platform connected to the root, an airfoil connected to and extending from the platform, and a tip connected to the airfoil on a distal end of the airfoil that is opposite from the root. The platform includes a second material that is different from the first material.

The assembly of the preceding paragraph can optionally include, additionally and/or alternatively, any one or more of the following features, configurations and/or additional components.

The second additive manufacturing process can be determined based on a finite element analysis of a three-dimensional model of the blade.

The airfoil can include a hotspot region, wherein the hotspot region can correspond to a region of the blade that experiences high stress when in use, wherein the hotspot region can include a third material that can be different than other portions of the airfoil, wherein a location, a shape, and/or a size of the hotspot region can be identified by the finite element analysis of the three-dimensional model of the blade.

A composition of the airfoil can vary in a blended fashion in a vicinity of the hotspot region.

A method of forming a blade includes creating a three-dimensional model of an airfoil. A stress profile of the blade is created with a finite element analysis tool. The stress profile is combined with the three-dimensional model of the blade. Different materials and different layer-by-layer additive manufacturing processes are assigned to different regions of the blade based upon the stress profile. The blade is formed to include a root, a platform, an airfoil, and a tip. The root of the airfoil is formed with a first material and with a first layer-by-layer additive manufacturing process. The platform is connected to the boot. The airfoil is connected to the platform and is formed with a second material and with a second layer-by-layer additive manufacturing process that is different from the first layer-by-layer additive manufacturing process. The tip is connected to the airfoil and is formed with a third layer-by-layer additive manufacturing process that is different from the second layer-by-layer additive manufacturing process.

The method of the preceding paragraph can optionally include, additionally and/or alternatively, any one or more of the following steps, features, configurations and/or additional components.

A first region of the airfoil subject to at least one of high stress or high temperature can be identified with the stress profile; a second region of the airfoil subject to at least one of low stress or low temperature can be identified with the stress profile; a first material with which to form the first region of the airfoil can be determined based on the stress profile; a second material with which to form the second region of the airfoil can be determined based on the stress profile; and/or the first region of the airfoil with the first material and the second region of the airfoil with the second material can be formed with layer-by-layer additive manufacturing.

The first region of the airfoil can comprise the root, and/or wherein the second region of the airfoil can comprise at least one of the platform, the airfoil, and/or the tip.

A size, a shape, and/or a location of the first region of the airfoil can be determined from the stress profile; and/or a size, a shape, and/or a location of the second region of the airfoil can be determined from the stress profile.

The first, second, and/or third layer-by-layer additive manufacturing process can comprise at least one of electron-beam melting, laser powder bed fusion, cold spray, and/or directed energy deposition.

A fourth additive manufacturing process can be used to form a rotor hub; and/or wherein forming the airfoil further can comprise forming, with the first layer-by-layer additive manufacturing process, the airfoil to the hub such that the hub and the airfoil can be a single piece of material.

Operating conditions can be applied to the three-dimensional model of the blade; the three-dimensional model of the blade with the applied operating conditions can be processed with a finite element solver; and/or the stress profile of the blade can be determined based on an output of the finite element solver.

The rotor hub can be scanned with a three dimensional optical scanning tool; measurements of the rotor hub can be determined from a three dimensional scan of the rotor hub; a three dimensional model of the rotor hub can be created; and/or a tool path for the layer-by-layer additive manufacturing process can be generated based on the three dimensional model of the rotor hub.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a blade, the method comprising:
creating a three-dimensional model of the blade;
creating, with a finite element analysis tool, a stress profile of the blade;
combining the stress profile with the three-dimensional model of the blade;
assigning different material compositions and different layer-by-layer additive manufacturing processes to different regions of the blade based upon the stress profile;
forming the blade, wherein forming the blade comprises:
   forming a root of the blade with a first material composition and with a first layer-by-layer additive manufacturing process;
   forming a platform connected to the root;
   forming an airfoil connected to the platform, wherein the airfoil is formed with a second material composition and with a second layer-by-layer additive manufacturing process that is different from the first layer-by-layer additive manufacturing process; and
   forming a tip connected to the airfoil, wherein the tip is formed with a third layer-by-layer additive manufacturing process that is different from the second layer-by-layer additive manufacturing process.

2. The method of claim 1, further comprising:
identifying, with the stress profile, a first region of the airfoil subject to at least one of high stress or high temperature;
identifying, with the stress profile, a second region of the airfoil subject to at least one of low stress or low temperature;

determining, based on the stress profile, a first material composition with which to form the first region of the airfoil;

determining, based on the stress profile, a second material composition with which to form the second region of the airfoil; and forming, with layer-by-layer additive manufacturing, the first region of the airfoil with the first material composition and the second region of the airfoil with the second material composition.

3. The method of claim 1, further comprising:

determining, from the stress profile, a size, a shape, and a location of the first region of the airfoil; and determining, from the stress profile, a size, a shape, and a location of the second region of the airfoil.

4. The method of claim 1, wherein the first, second, or third layer-by-layer additive manufacturing process comprises at least one of electron-beam melting, laser powder bed fusion, cold spray, and directed energy deposition.

5. The method of claim 1, wherein creating the stress profile of the blade comprises:

applying operating conditions to the three-dimensional model of the blade;

processing, with a finite element solver, the three-dimensional model of the blade with the applied operating conditions; and determining the stress profile of the blade based on an output of the finite element solver.

6. The method of claim 1, wherein the method further comprises:

forming, with a fourth additive manufacturing process, a rotor hub before forming the blade; and wherein forming the airfoil further comprises:

forming, with the first layer-by-layer additive manufacturing process, the airfoil to the hub such that the hub and the airfoil are a single piece of material.

7. The method of claim 6, further comprising:

scanning, with a three dimensional optical scanning tool, the rotor hub;

determining, from a three dimensional scan of the rotor hub, measurements of the rotor hub;

creating a three dimensional model of the rotor hub; and generating a tool path for the fourth additive manufacturing process based on the three dimensional model of the rotor hub.

8. An assembly comprising:

a blade and a rotor hub formed according to the method of claim 1, wherein the formation of the rotor hub further comprises the method of claim 6.

9. A component comprising a blade formed according to the method of claim 1.

* * * * *